(No Model.)
M. REHM.
SUBSOIL PIPE.
No. 453,502. Patented June 2, 1891.
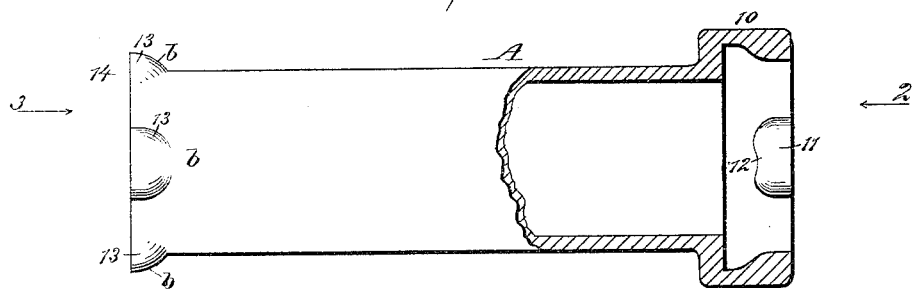
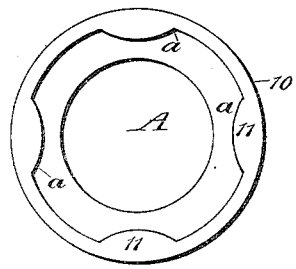
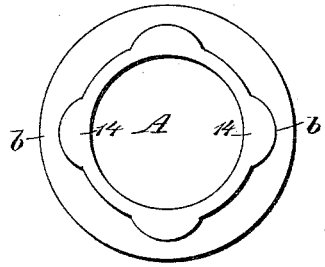
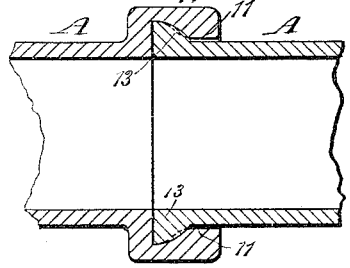
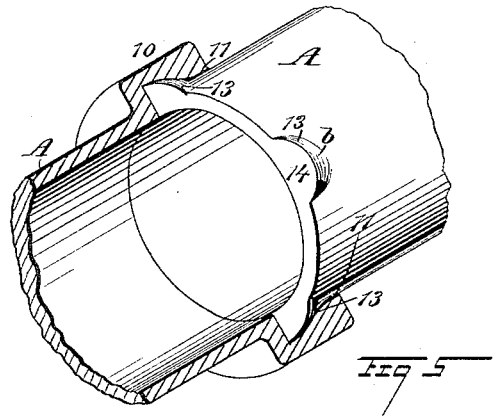
WITNESSES:
H. Walker
C. Sedgwick
INVENTOR:
M. Rehm
BY
[signature]
ATTORNEYS

UNITED STATES PATENT OFFICE.

MARTIN REHM, OF LONG ISLAND CITY, NEW YORK.

SUBSOIL-PIPE.

SPECIFICATION forming part of Letters Patent No. 453,502, dated June 2, 1891.

Application filed April 8, 1891. Serial No. 388,127. (No model.)

*To all whom it may concern:*

Be it known that I, MARTIN REHM, of Long Island City, in the county of Queens and State of New York, have invented a new and useful Improvement in Subsoil-Pipes, of which the following is a full, clear, and exact description.

My invention relates to an improvement in subsoil-pipes, and has for its object to provide a means whereby the spigot end of a pipe-section may be positively and securely locked when inserted in the hub of an opposed pipe-section by turning one section a slight distance either to the right or to the left, as may be most convenient.

A further object of the invention is to so construct the pipe-sections that when coupled a packing will not be needed at the joints, and whereby, when the sections are locked together, their inner cylindrical faces will be flush at their abutting surfaces.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in all the views.

Figure 1 is a side elevation of a pipe constructed in accordance with my invention, the said pipe being in section at its hub end. Fig. 2 is an end view of the pipe viewed from its hub end, as indicated by the arrow 2 in Fig. 1. Fig. 3 is an end view taken from the spigot end of the pipe, as indicated by the arrow 3 in Fig. 1. Fig. 4 is a longitudinal section taken through the coupling of two pipes, and Fig. 5 is a partial perspective view and partial sectional view of the coupling of two pipes.

The pipes to which the improvements are applied are especially adapted to be used below the surface of the ground, and are made of terra-cotta, metal, or other approved material, terra-cotta or clay being, however, preferred.

In the hub 10 of the pipe A lugs 11 are formed, preferably four in number, and arranged at equidistance apart, or practically so. The lugs are located in such manner that their outer faces are flush with the outer end surface of the hub, as illustrated in Fig. 2. The upper faces of the lugs are preferably convex, as illustrated at $a$, and the inner edges of the lugs are concave, forming a central cavity 12, the concavity being made quite gradual, as is illustrated in Fig. 1. A space is made to intervene the inner concaved faces of the lugs and the back or flanged section of the hub. At the spigot end of the pipe lugs 13 are produced, which lugs correspond in number and location preferably with those upon the hub. The outer faces of the lugs 13 are straight, as illustrated at 14 in Fig. 3, and said faces are preferably flush with the outer spigot-end surface of the pipe. The entire upper surface of each lug is convexed, as illustrated at $b$. In fact, the outer surfaces of the lugs appearing upon the pipe are practically semi-cylindrical, and the convexity of the lugs 13 corresponds, essentially, to the concavity in the inner faces of the hub-lugs 11.

When two pipes are to be coupled, the spigot end of one pipe is introduced into the hub end of the opposing pipe, and the lugs 13 at the spigot end are entered in the hub between the lugs 11 of the latter. When the end surface of the spigot extremity of the pipe engages with the flange or back of the hub, by turning either pipe to the right or to the left the central convexed portions of the lugs 13 are made to enter the cavities 12 of the lugs 11, and a firm, secure, and tight joint is made, the lock being so effective that no packing of any description is required. When two pipes are coupled, their abutting ends are brought snugly together, as illustrated in Figs. 4 and 5, and when the coupled pipes are viewed from the end their inner surfaces appear perfectly smooth and unbroken. It will be observed that a lock of this character is especially adapted for subsoil-pipes, and that it may be as conveniently applied to clay or terra-cotta pipe as to metal pipe, and by reason of the lock one pipe supports the other and a long section may be laid in a straight line with little difficulty.

I am aware that pipes adapted to be calked, and adapted consequently for use above ground, have been made with lugs in their hub ends and lugs upon their spigot ends; but said lugs have been straight at their sides and afforded no locking connection whatever, the lock being accomplished by the packing and the lugs being adapted to hold the pipes together while the packing is accomplished. The difference between such a construction and that above described is obvious.

Having thus described my invention, I claim as new and desire to secure by Letters Patent—

A subsoil-pipe provided within its hub-end with a series of spaced lugs, the outer faces of which are straight and flush with the hub end surface of the pipe and the inner surfaces of said lugs being concave, and lugs formed upon the spigot end of the pipe, the outer faces of which are straight and flush with the spigot-end surface, the inner surfaces of these latter lugs being convex or semi-cylindrical to enter the concavities in the lugs located in the hub-section of an opposed pipe, as and for the purpose specified.

MARTIN REHM.

Witnesses:
 JOHN NICOLAS SIEBERT,
 WILLIAM DUNN.